US008353549B2

(12) United States Patent
Buchheit

(10) Patent No.: US 8,353,549 B2
(45) Date of Patent: Jan. 15, 2013

(54) PUSH BUTTON MECHANISM FOR OPENING AND CLOSING A STORAGE COMPARTMENT FOR A VEHICLE

(75) Inventor: Nathaniel J. Buchheit, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 13/088,881

(22) Filed: Apr. 18, 2011

(65) Prior Publication Data

US 2012/0261937 A1 Oct. 18, 2012

(51) Int. Cl.
*B60J 7/00* (2006.01)

(52) U.S. Cl. ......... 296/37.12; 296/24.34; 70/77; 292/33

(58) Field of Classification Search ............... 296/37.12, 296/24.34, 37.8, 37.1; 70/77, 158, 159; 292/42, 292/33

See application file for complete search history.

(56) References Cited

U.S. PATENT DOCUMENTS

| | | | | |
|---|---|---|---|---|
| 4,547,006 | A | 10/1985 | Castanier | |
| 5,626,374 | A | 5/1997 | Kim | |
| 6,120,069 | A | 9/2000 | Taranto | |
| 7,156,440 | B2 * | 1/2007 | Katagiri | 296/37.12 |
| 7,380,855 | B2 | 6/2008 | Ishiguro et al. | |
| 7,451,628 | B1 | 11/2008 | Kim | |
| 7,475,929 | B2 | 1/2009 | Yamada | |
| 7,766,409 | B2 * | 8/2010 | Ohnuki | 296/37.12 |
| 2009/0152887 | A1 | 6/2009 | Schaupensteiner et al. | |

* cited by examiner

*Primary Examiner* — Joseph Pape

(74) *Attorney, Agent, or Firm* — Rankin Hill & Clark LLP

(57) ABSTRACT

An opening and closing mechanism for a lid of a storage receptacle provided on a vehicle comprises a push button, a button pin and a lid linkage. The push button includes a first slider having an inclined face at a rear end thereof. The button pin includes a second slider having a first inclined face cooperating with the inclined face of the first slider. The first inclined face is spaced from a rear end of the second slider. The second slider is biased to contact the first slider. The lid linkage has a first end selectively engaged by the rear end of the second slider and a second end for selectively locking the lid in a closed state. The lid linkage is biased toward the second slider. Engagement of the push button with the button pin moves the second slider, which, in turn, allows the lid linkage to move toward the second slider to unlock the storage receptacle lid.

20 Claims, 4 Drawing Sheets

PUSH BUTTON MECHANISM FOR OPENING AND CLOSING A STORAGE COMPARTMENT FOR A VEHICLE

BACKGROUND

Exemplary embodiments herein generally relate to a push button mechanism for opening and closing a storage compartment or closure, such as a glovebox, in a vehicle.

A variety of opening and closing mechanisms for a vehicle storage compartment or glovebox are known. In one known arrangement, the opening and closing mechanism is located in a cutout of the glovebox door, located on an outer surface of the door, or mounted on an instrument panel or dashboard or other like vehicle structure. Sometimes an electric lock is included. A typical known mechanism includes a latch mounted to either the glovebox door or the dashboard, a push button mounted to the other one of the door or the dashboard, a rack bar connected to the push button and extending inward, a pinion engaged with the rack bar, and a link having a rack gear engaged with the pinion. The link is movable to lock and unlock the latch. Because the known design typically includes the latch, which is unlocked through the rack and pinion mechanism, the mechanism has complicated structures and, in certain instances, is not effective.

BRIEF DESCRIPTION

In accordance with one aspect, an opening and closing mechanism for a lid of a storage receptacle provided on a vehicle comprises a push button, a button pin and a lid linkage. The push button includes a first slider having an inclined face at a rear end thereof. The button pin includes a second slider having a first inclined face cooperating with the inclined face of the first slider. The first inclined face is spaced from a rear end of the second slider. The second slider is biased to contact the first slider. The lid linkage has a first end selectively engaged by the rear end of the second slider and a second end for selectively locking the lid in a closed state. The lid linkage is biased toward the second slider. Engagement of the push button with the button pin moves the second slider, which, in turn, allows the lid linkage to move toward the second slider to unlock the storage receptacle lid.

In accordance with another aspect, a vehicle assembly comprises a supporting structure, a storage receptacle mounted to the supporting structure, and an opening and closing mechanism operably associated with the storage receptacle. The storage receptacle includes a first wall and a second wall spaced from the first wall. The first and second walls at least partially define the storage compartment. Each of the first wall and the second wall includes an opening. A lid is movably mounted to one of the supporting structure and the receptacle for selectively providing access to the storage compartment. The lid includes a first sidewall and a second sidewall spaced from the first sidewall. Each of the first sidewall and the second sidewall has a lock opening which is aligned with one of the openings provided in the first and second walls when the lid is in a closed state.

The mechanism includes a push button, a first locking member and a second locking member. The push button is moveable supported on one of the structure and the storage receptacle and includes an engagement member having an inclined face at a rear end thereof which projects away from the storage receptacle. The first locking member is movably supported on the structure. The first locking member includes a first inclined face corresponding in shape to the inclined face of the engagement member and a second inclined face at a rear end thereof. The first locking member is normally urged toward the first wall of the storage receptacle. In the closed state of the lid, the second end projects through the opening provided in the first wall and the lock opening provided in the first sidewall for locking the lid in the closed state. The second locking member is provided in the storage receptacle lid and is movably supported on the lid. The second locking member is normally urged inwardly away from the second wall of the storage receptacle. The second locking member has a first end and a second end, the first end being engaged by the rear end of the first locking member in the lid closed state. The engagement by the first locking member moves the second end through the lock opening provided in the second sidewall and the opening provided in the second wall for locking the lid in the closed state.

In accordance with yet another aspect, a vehicle assembly comprises a dashboard, a glovebox mounted to the dashboard, and an opening and closing mechanism operably associated with the glovebox. The glovebox includes a first wall and a second wall spaced from the first wall. The first and second walls at least partially define a storage compartment. Each of the first wall and the second wall includes an opening. A lid is movably mounted to the glovebox for selectively providing access to the storage compartment. The lid includes a first sidewall and a second sidewall spaced from the first sidewall. Each of the first sidewall and the second sidewall has a lock opening which is aligned with one of the openings provided in the first and second walls when the lid is in a closed state.

The mechanism includes a push button, a spring-loaded button pin and a lid linkage. The push button is moveably supported on the dashboard and has an inclined face at its rear end. The spring-loaded button pin is positioned on the dashboard and has a first inclined face corresponding in shape to the inclined face of the push button. In the lid closed state, the button pin selectively engages the opening provided in the first wall and the lock opening provided in the first sidewall. The lid linkage is moveably supported on the lid. In the lid closed state, the button pin displaces the lid linkage toward the second wall and the lid linkage selectively engages the lock opening provided in the second sidewall and the opening provided in the second wall. A first spring normally biases the button pin toward the first wall. A second spring normally biases the lid linkage away from the second wall. The second spring is intervened between a lid structure and a portion of the lid linkage. Displacement of the push button engages the inclined face of the push button with the corresponding first inclined face of the button pin. The button pin is movable in a transverse direction relative to the movement of the push button away from the glovebox. Movement of the button pin allows the lid linkage to be biased in the same direction as the button pin away from the second wall.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary opening and closing mechanism for a storage receptacle provided on a structure of a vehicle disclosed herein are merely terms of art that may vary from one manufacturer to another and should not be deemed to limit the present disclosure.

Figure 1:
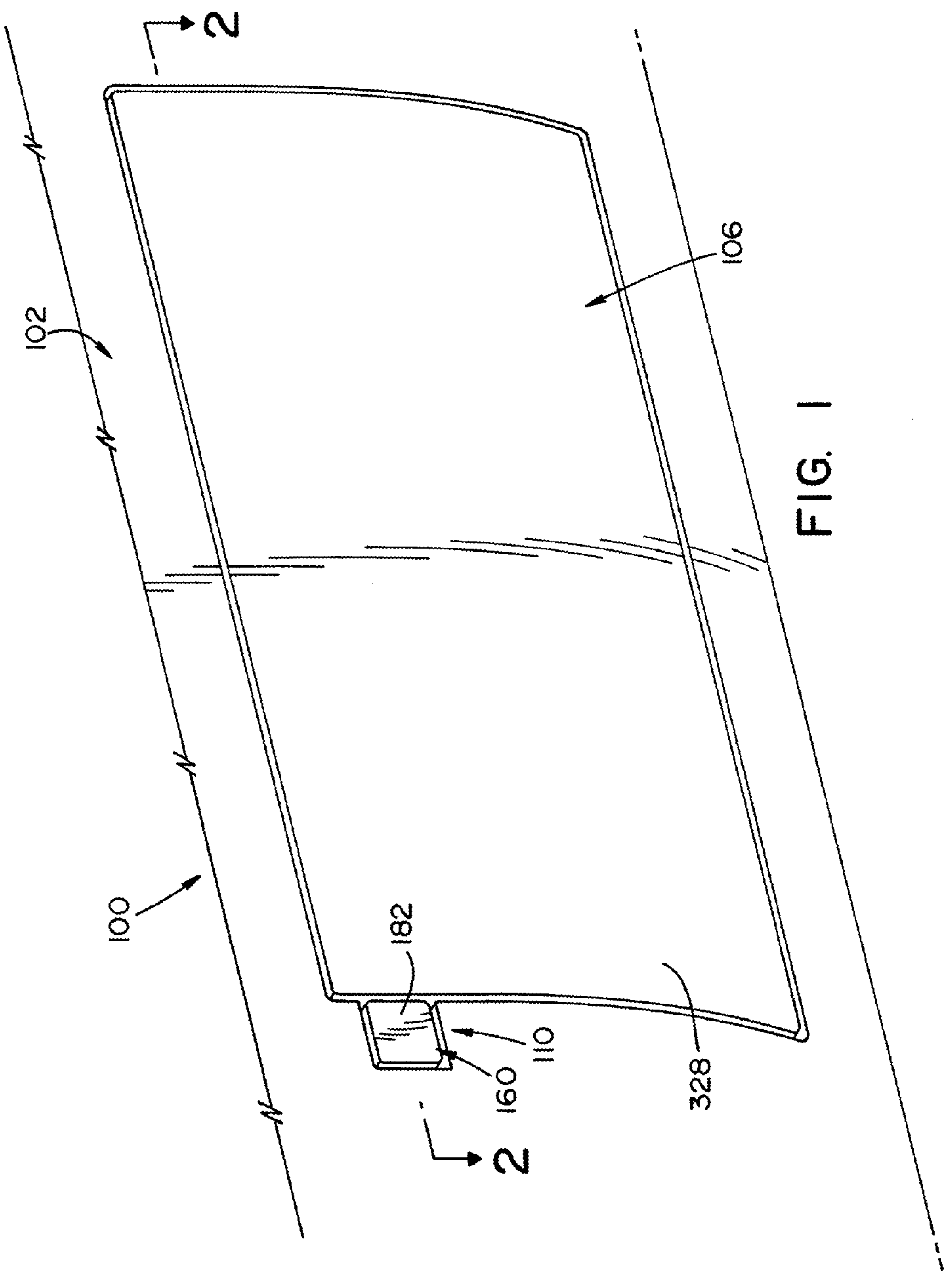
FIG. 1 schematically illustrates a vehicle assembly including a supporting structure, a storage receptacle mounted to the supporting structure, and an exemplary opening and closing mechanism operably associated with the storage receptacle according to the present disclosure.
Figure 2:
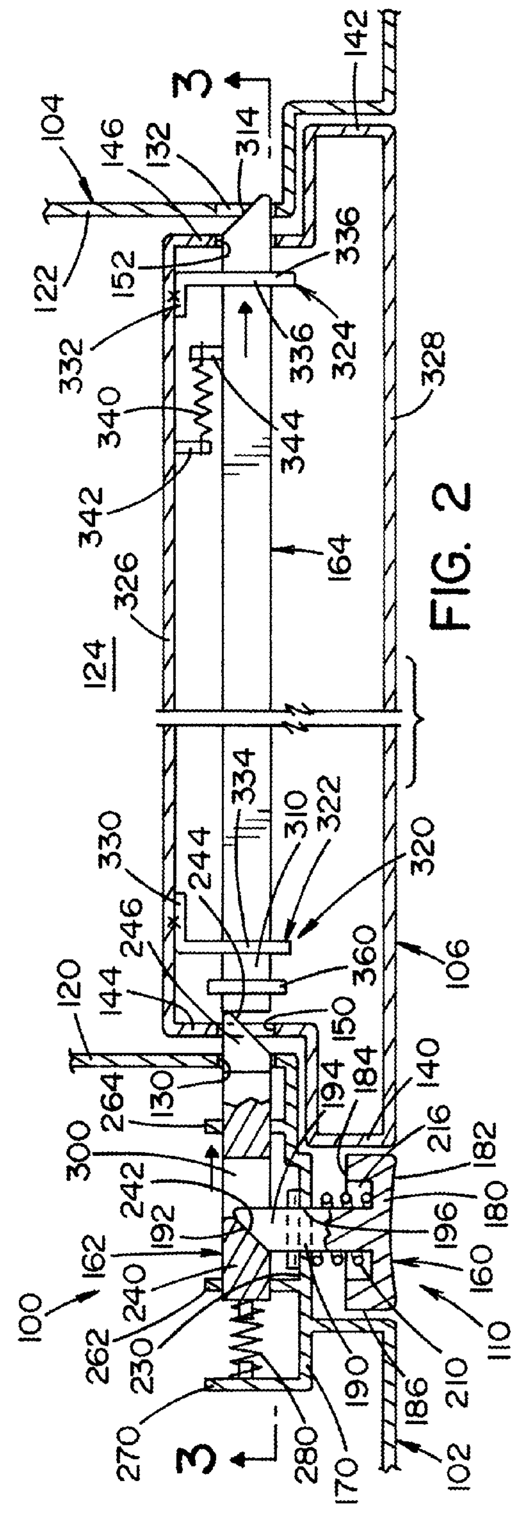
FIG. 2 is a cross-sectional view of the assembly of FIG. 1 taken generally along line 2-2 of FIG. 1, the mechanism being in a locked position.
Figure 3:
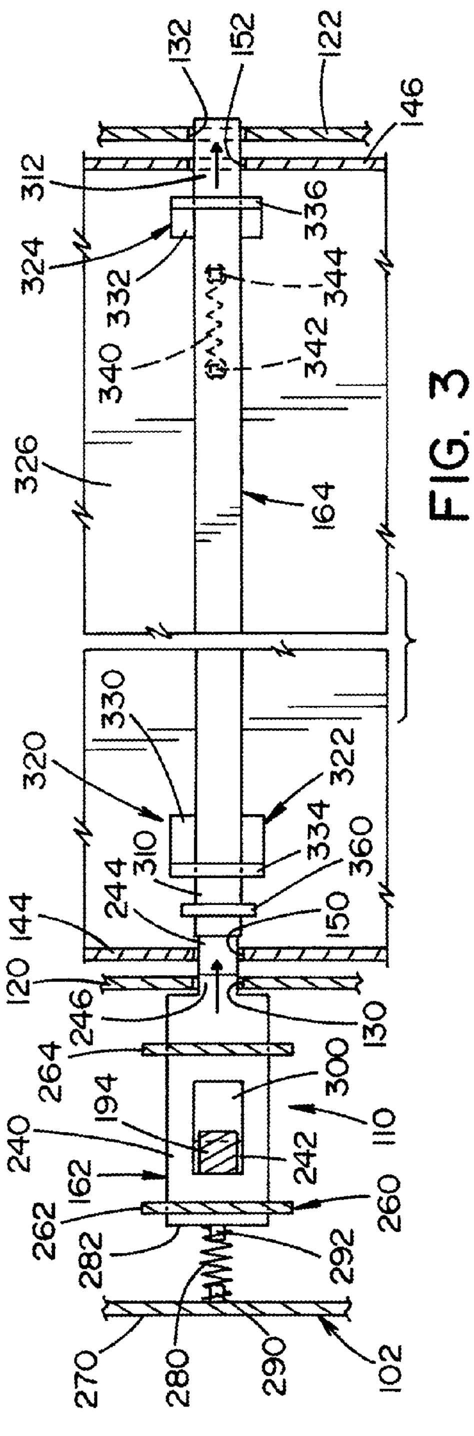
FIG. 3 is a cross-sectional view of the assembly of FIG. 2 taken generally along line 3-3 of FIG. 2.

Referring now to the drawings, wherein like numerals refer to like parts throughout the several views, FIGS. 1-3 schematically illustrate a vehicle assembly 100 comprising a supporting structure 102, a storage receptacle 104 mounted to the supporting structure 102, a lid 106 moveably mounted to one of the supporting structure and the receptacle, and an opening and closing mechanism 110 operably associated with the storage receptacle. As depicted, the receptacle 104 is integrally formed with the vehicle structure 102; although, it should be appreciated that the receptacle can be a separate member. The vehicle structure 102 can be an instrument panel, a dashboard or other like structure and will be referenced hereafter as a dashboard, and the storage receptacle 104 can be a glovebox or other like closure and will be referenced hereafter as a glovebox. The glovebox 104 includes a first wall 120 and a second wall 122 spaced from the first wall. The first and second walls 120,122 at least partially define a storage compartment 124. The first wall 120 includes a first opening 130 and the second wall 122 includes a second opening 132, which is aligned with the first opening. The lid 106 is movably, e.g. pivotably or rotatably, mounted to the glovebox 104 for selectively providing access to the storage compartment 124. The lid 106 includes a first sidewall 140 and a second sidewall 142 spaced from the first sidewall. Each of the first sidewall 140 and the second sidewall 142 includes a respective inwardly offset portion 144,146. As shown in FIGS. 2 and 3, offset portion 144 includes a first lock opening 150 which is aligned with the first opening 130 provided in the first wall 120 and offset portion 146 includes a second lock opening 152 which is aligned with the second opening 132 provided in the second wall 122 when the lid 106 is in a closed state.

With continued reference to FIGS. 2 and 3, the opening and closing mechanism 110 includes a push button 160, a first locking member or button pin 162 and a second locking member or lid linkage 164. The push button 160 is moveably supported on one of the structure 102 and the storage receptacle 104. In the illustrated exemplary embodiment, the push button 160 is provided in an offset section 170 of the dashboard 102 located adjacent to the lid 106. The push button includes a base member 180 having a front wall 182, a rear wall 184 and a sidewall 186 which extends between the front wall and the rear wall. An engagement member or first slider 190 extends outwardly from the rear wall 184 of the base member 180 and has an inclined face 192 at a rear end portion 194 thereof. The inclined face 192 projects away, e.g. slopes inwardly, from the first wall 120 of the storage receptacle 104. The rear end portion 194 projects through an aperture 196 located in the offset section 170.

A biasing member is provided for biasing the push button 160 outwardly relative to the offset section 170. As shown, the biasing member is a spring 210 which circumscribes the first slider 190. In the depicted exemplary embodiment, an end portion of the spring is provided in a cutout or recess 216 located in the rear wall 184 and is intervened between the rear wall 184 and the offset section 170. Although, alternative manners for mounting the spring to the push button 160 are contemplated. As indicated above, the spring 210 biases the push button 160 away from the offset section 170 of the dashboard 102. To maintain engagement of the push button 160 with the dashboard 102, a pin 224 extends through a bore 226 located in the rear end portion 194 of the first slider 190. As the push button 160 is urged away from the offset section 170 via the spring 210, the pin 224 engages an inner surface 230 of the offset section 170 which faces the button pin 162. It should be appreciated that alternative manners for securing the push button 160 to the dashboard 102 are contemplated. For example, a separate housing can be mounted to the offset section 170 and the push button can be moveably mounted to the housing via the spring 210.

As illustrated in FIGS. 2 and 3, the exemplary button pin 162 includes an engagement member or second slider 240 having a longitudinal axis substantially perpendicular to a longitudinal axis of the first slider 190. The second slider 240 includes a first inclined face 242 corresponding or complementary in shape to the inclined face 192 of the first slider 190 and a second inclined face 244 at a rear end portion 246 thereof. As shown, the first inclined face 242 is spaced from the rear end portion 246 and is selectively engaged by the inclined face 192 of the first slider 190 as the push button 160 is depressed inwardly toward the offset section 170.

As best depicted in FIGS. 2 and 3, the button pin 162 is movably supported on the dashboard 102. According to one aspect, the offset section 170 can include a guide 260 configured to slidably support the button pin 162. The guide 260 includes a first arm structure 262 and a second arm structure 264 that is spaced from the first arm structure. The first arm structure 262 can be located near a wall 270 of the offset section 170 and the second arm structure can be located near the first wall 120 of the receptacle 104. Each arm structure 262,264 extends substantially perpendicularly from the surface 230 of the offset section 170 and includes an opening dimensioned to slidingly receive the second slider 240. It should be appreciated that alternative manners for movably supporting the button pin on the dashboard are contemplated.

The second slider 240 is normally biased or urged toward the first wall 120 of the storage receptacle 104 via a biasing member to selectively lock the storage receptacle lid 106 in the closed state. In the illustrated embodiment, the biasing member is a spring 280 intervened between the wall 270 of the dashboard 102 and an end portion 282 of the second slider 240. According to one aspect, the spring 280 has a first end portion connected to a projection 290 provided on the wall 270 and a second end portion connected to a projection 292 provided on the end portion 282; although, alternative manner for connecting the spring 280 are contemplated. With this configuration, in the closed state of the lid, the spring-loaded button pin 162 selectively engages the dashboard 102 and the lid 106 of the glovebox 104. Specifically, the rear end portion 246 of the second slider 240 projects at least partially through the first opening 130 provided on the first wall 120 of the storage receptacle 124 and the first lock opening 150 provided on the first sidewall 144 of the lid 106.

With reference again to FIGS. 2 and 3, the second slider 240 of the button pin 162 includes an opening or through hole 300 dimensioned to at least partially receive the inclined face 192 of the push button 160. The first inclined face 242 of the second slider 240 is formed at a portion of a periphery of the opening 300. Particularly, the first inclined face 242 is formed on an inner surface which at least partially defines the opening 300. As will be discussed in greater detail below, and as shown in FIG. 4, depression of the push button 160 moves the inclined face 192 of the first slider 190 into contact with the first inclined face 242 of the second slider 240 thereby moving the second slider away from the glovebox 104.

The lid linkage 164 is provided in the storage receptacle lid 106 and has a longitudinal axis substantially parallel to the longitudinal axis of the second slider 240. As depicted, the lid linkage 164 is dimensioned to span between the first and second sidewalls 140,142 of the lid 106 and includes a first end portion 310 and a second end portion 312. The second end portion 312 of the lid linkage is adapted to selectively lock the storage receptacle lid 106 in its closed state and includes an inclined face 314 which projects toward the receptacle sidewall 142. The lid linkage 164 is movably supported on the lid 106. According to one aspect, the lid can include a guide 320 configured to slidably support the lid linkage. The guide 320 includes a first arm structure 322 and a second arm structure 324 that is spaced from the first arm structure. The first arm structure can be located near the lid first sidewall 140 and the second arm structure can be located near the lid second sidewall 142. Each arm structure 322,324 extends substantially perpendicularly from one of a rear wall 326 and a front wall 328 of the lid. As shown, the first and second arm structures 322,324 are generally L-shaped and include a respective first member 330,332 and a respective second member 334,336. Each first member 330,332 is fixedly secured to the wall 326. Each second member 334,336 includes an opening dimensioned to slidingly receive the lid linkage 164. It should be appreciated that other shapes for the arm structures 322,324 and alternative manners for slidably supporting the lid linkage 164 on the lid 106 are contemplated.

Figure 4:
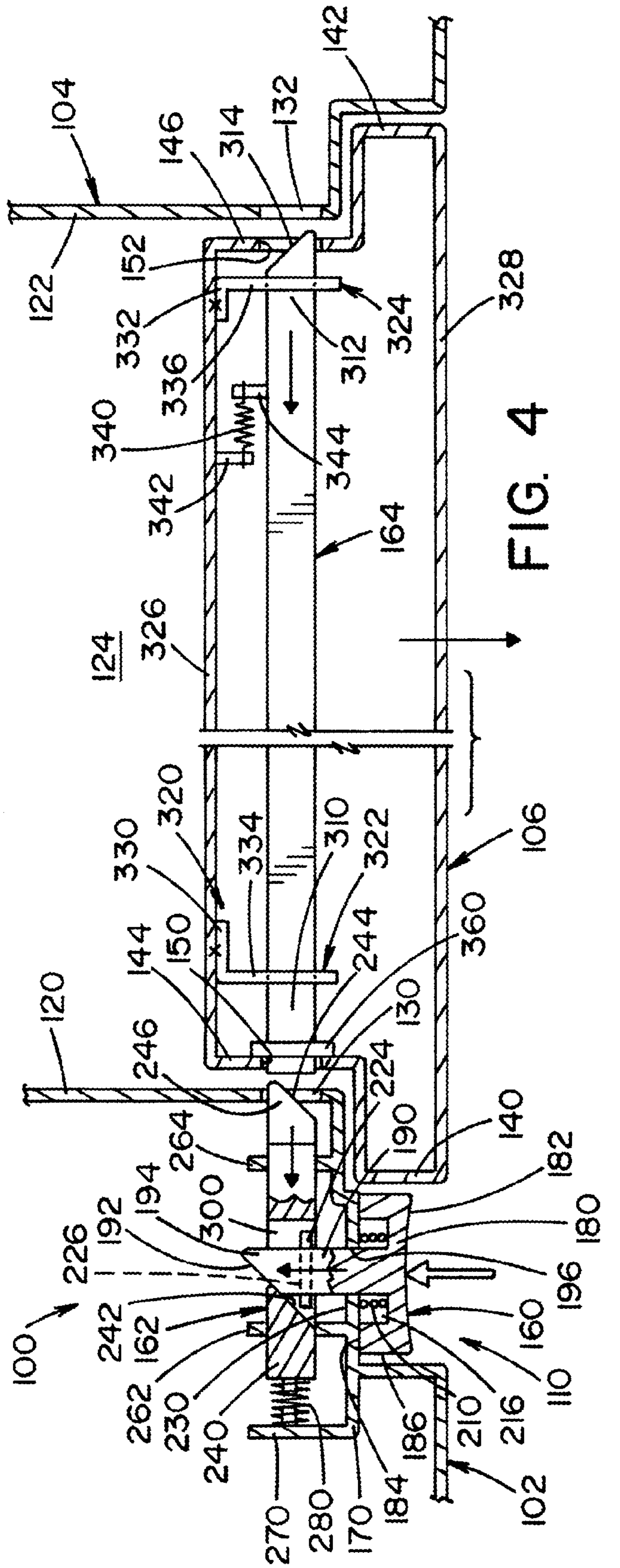
FIG. 4 is a cross-sectional view similar to FIG. 2 showing the mechanism being in an unlocked position.

The lid linkage 164 is normally biased or urged away from the second wall 122 toward the second slider 240 via a biasing member (FIG. 4). In the illustrated embodiment, the biasing member is a spring 340 intervened between a projecting structure or tab 342 provided on the lid 106 and a structure or tab 344 provided on the lid linkage 164. The lid structure 342 extends outwardly from the wall 326 and is located between the first and second arm structures 322,324. The tab 344 projects toward the wall 326 and is located between the structure 342 and the lid second sidewall 142. The spring 340 has a first end portion connected to the lid structure 342 and a second end portion connected to the tab 344. In the closed state of the lid, the first end portion 310 of the lid linkage 164 is engaged by the rear end portion 246 of the second slider 240 and displaces the lid linkage 164 toward the second wall 122. Because the spring or urging force of the spring 280 is greater than the spring or urging force of the spring 340, this engagement causes the second end portion 312 of the lid linkage 164 to project at least partially through the second lock opening 152 provided in the second sidewall 142 and the opening 132 provided in the second wall 122 of the receptacle 104.

Figure 5:
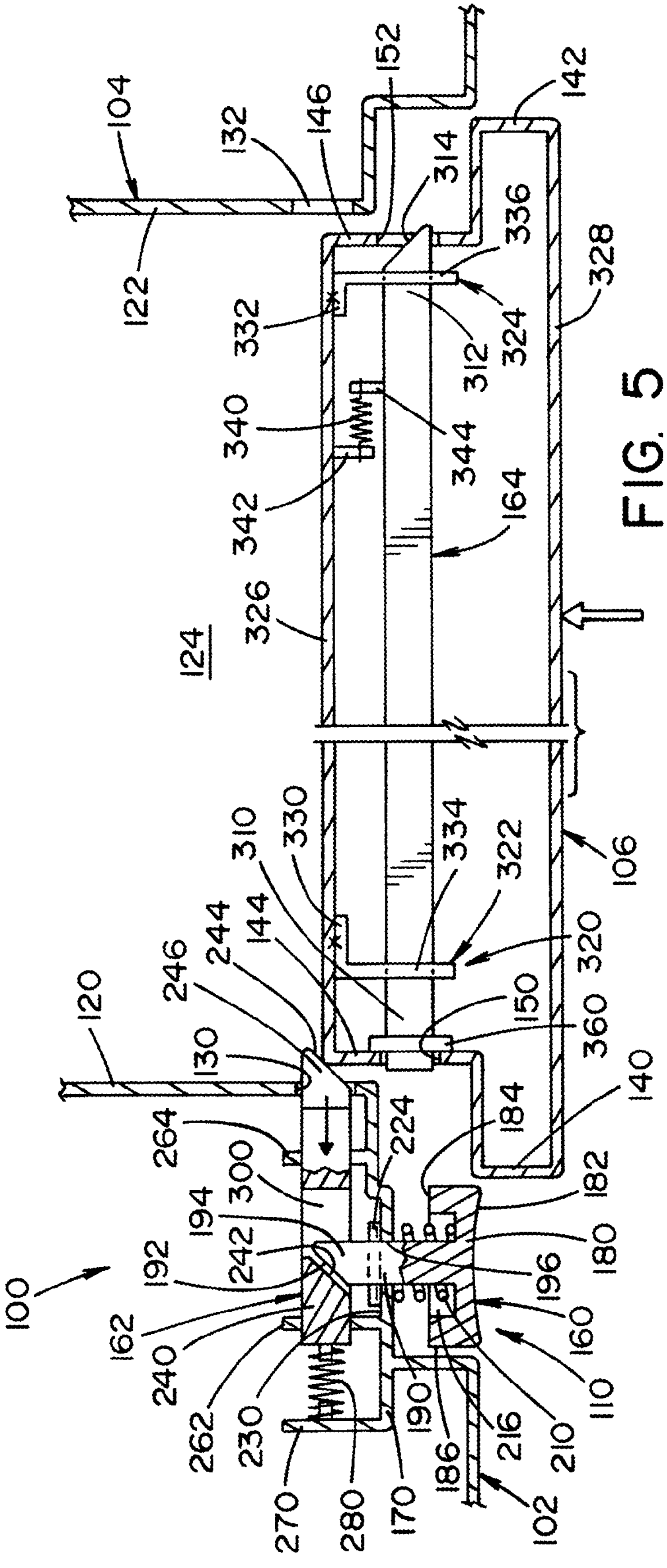
FIG. 5 is a cross-sectional view similar to FIG. 4 showing the position of the mechanism when a lid of the storage receptacle in an open state.

With this configuration, and as depicted in FIGS. 4 and 5, displacement of the push button 160 engages the inclined face 192 of the push button 160 with the corresponding first inclined face 242 of the button pin 162. The button pin 162 is movable in a transverse direction relative to the movement of the push button 160 away from the glovebox 104. This movement of the button pin 162 allows the lid linkage 164 to move in the same direction as the second slider 240 of the button pin away from the second wall 122 thereby unlocking the lid 106. The first end portion 310 of the lid linkage 164 is configured to prevent the lid linkage from projecting through the first lock opening 150 provided in the lid first sidewall 140 as the second slider 240 is moved away from the glovebox 104. In the depicted exemplary embodiment, a flange 360 is mounted to the first end portion 310. The flange 360 engages an inner surface of the first sidewall 140 which stops the transverse movement of the lid linkage 164 toward the first sidewall 140 and away from the second sidewall 142.

As is evident from the foregoing, the opening and closing mechanism 110 for the lid 106 of the glovebox 104 includes the push button 160, the spring-loaded button pin 162, and the lid linkage 164. The button pin 160 is positioned on the dashboard 102 and, in the lid closed position, selectively engages the opening 130 and first lock opening 150. As shown in FIGS. 2 and 3, in the lid closed position, the button pin 162 displaces the lid linkage 164 toward the second wall 122 of the glovebox 104 and the lid linkage 164 selectively engage the second lock opening 152 and the opening 132. This engagement of the button pin and the lid linkage prevents the lid 106 from opening. The button pin 162 is biased toward the first wall 122 via the spring 280 and the lid linkage 164 is biased away from the second wall 122 via the spring 340.

As shown in FIGS. 4 and 5, to open the glovebox lid 106, the push button 160 is displaced. The push button 160 includes the first slider 190 having the inclined face 192 at its rear end portion 194. This inclined face is selectively engaged with a corresponding inclined face 242 provided on the button pin 162. Displacement of the push button 160 causes the inclined face 192 of the push button to move into the opening 300 and engage the inclined face 242 of the button pin. This engagement moves the button pin 162 out of the first lock opening 150 provided in the offset portion 144 of the first wall 140 of the lid 106. As the button pin 162 is moved away from the glovebox, the lid linkage 164 is biased out of engagement with the second wall opening 132 via the spring 340. The lid can then be opened.

Once is lid 106 is opened, the push button 160 is released and the spring 210 moves the push button back to its initial position. The spring 280 moves the button pin 162 back toward the glovebox causing the second inclined face 244 of the rear end portion 246 to project at least partially through the opening 130. Closing the lid moves the first sidewall 140 into contact with the rear end portion 246. The button pin 162 is at least partially displaced away from the first wall 120. In the closed state of the lid, the button pin 162 is aligned with the lid linkage 164. As indicated above, the button pin 162 then displaces the lid linkage back toward the second wall 122 and into engagement with the opening 132. Therefore, by using the spring-loaded button pin 162 to engage one side of the glovebox 104 and lid 106 and the sliding linkage to engage the other side of the glovebox and lid, the number of parts for the mechanism 110 as compared to known mechanisms is reduced while maintaining performance.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An opening and closing mechanism for a lid of a storage receptacle provided on a vehicle comprising:

a push button including a first slider having an inclined face at a rear end thereof;

a button pin including a second slider having a first inclined face cooperating with the inclined face of the first slider, the first inclined face being spaced from a rear end of the second slider, the second slider being biased to contact the first slider;

a lid linkage having a first end selectively engaged by the rear end of the second slider and a second end for selectively locking the lid in a closed state, the lid linkage being biased toward the second slider, wherein engagement of the push button with the button pin moves the second slider, which, in turn, allows the lid linkage to move toward the second slider to unlock the lid.

2. The mechanism of claim 1, wherein the button pin is configured to selectively lock the lid in the closed state.

3. The mechanism of claim 2, wherein the rear end of the second slider includes a second inclined face which in the closed state of the lid projects at least partially through a first opening provided on a first wall of the storage receptacle and a first lock opening provided on a first sidewall of the lid.

4. The mechanism of claim 3, wherein the second end of the lid linkage includes an inclined face which in the closed state of the lid projects at least partially through a second lock opening provided on a second sidewall of the lid and a second opening provided on a second wall of the storage receptacle.

5. The mechanism of claim 3, wherein the first end of the lid linkage is configured to prevent the lid linkage from projecting through the first lock opening of the lid as the second slider is moved away from the storage receptacle.

6. The mechanism of claim 1, including a first biasing member for urging the second slider of the button pin toward the storage receptacle, the first biasing member having a first end connected to a vehicle structure and a second end connected to an end of the second slider.

7. The mechanism of claim 6, wherein an end portion of the second slider includes a projection, the second end of the first biasing member being connected to the projection.

8. The mechanism of claim 6, including a second biasing member for urging the lid linkage toward the second slider, the urging force of the first biasing member being greater than the urging force of the second biasing member.

9. The mechanism of claim 8, wherein the lid linkage is slidably supported in a guide provided on the lid.

10. The mechanism of claim 9, wherein the guide includes a first arm structure and a second arm structure that is spaced from the first arm structure, each arm structure including an opening for slidingly receiving the lid linkage.

11. The mechanism of claim 8, wherein the second biasing member is intervened between a lid structure and a tab provided on the lid linkage, a first end of the second biasing member being connected to the lid structure and a second end of the second biasing member being connected to the tab of the lid linkage.

12. The mechanism of claim 1, wherein the second slider of the button pin includes an opening dimensioned to at least partially receive the inclined face of the push button, the first inclined face of the second slider being formed at a portion of a periphery of the opening, depression of the push button moving the inclined face of the first slider into contact with the first inclined face of the second slider thereby moving the second slider away from the storage receptacle.

13. A vehicle assembly comprising:

a supporting structure;

a storage receptacle mounted to the supporting structure, the storage compartment including a first wall and a second wall spaced from the first wall, the first and second walls at least partially defining a storage compartment, each of the first wall and the second wall including an opening;

a lid movably mounted to one of the supporting structure and the receptacle for selectively providing access to the storage compartment, the lid including a first sidewall and a second sidewall spaced from the first sidewall, each of the first sidewall and the second sidewall having a lock opening, the lock opening being aligned with one of the openings provided in the first and second walls when the lid is in a closed state; and an opening and closing mechanism operably associated with the storage receptacle, the mechanism including:

a push button movably supported on one of the structure and the storage receptacle and including an engagement member having an inclined face at a rear end thereof which projects away from the storage receptacle;

a first locking member movably supported on the structure, the first locking member including a first inclined face corresponding in shape to the inclined face of the engagement member and a second inclined face at a rear end thereof, the first locking member being normally urged toward the first wall of the storage receptacle, wherein in the closed state of the lid, the second end projects through the opening provided in the first wall and the lock opening provided in the first sidewall for locking the lid in the closed state;

a second locking member provided in the storage receptacle lid and movably supported on the lid, the second locking member being normally urged inwardly away from the second wall of the storage receptacle, the second locking member having a first end and a second end, the first end being engaged by the rear end of the first locking member in the lid closed state, the engagement by the first locking member moving the second end through the lock opening provided in the second sidewall and the opening provided in the second wall for locking the lid in the closed state.

14. The assembly of claim 13, wherein engagement of the push button with the first locking member moves the rear end of the first locking member away from the first sidewall and the first wall of the storage receptacle, which, in turn, allows the second locking member to move away from the second wall of the storage receptacle and the second sidewall thereby unlocking the lid.

15. The assembly of claim 14, wherein the first locking member includes a through hole, the first inclined face being formed on an inner surface of the through hole, depression of the push button moving the inclined face of the engagement member into contact with the first inclined face.

16. The assembly of claim 14, wherein the first end of the second locking member is configured to prevent the second locking member from projecting through the lock opening provided on the first sidewall of the storage receptacle lid as the second locking member is moved toward the first sidewall and away from the second sidewall.

17. The assembly of claim 13, including a first spring for biasing the first locking member, the first spring having a first end connected to the structure and a second end connected to an end of the first locking member.

18. The assembly of claim 17, including a second spring for biasing the second locking member, the urging force of the first spring being greater than the urging force of the second spring, the second spring being intervened between a lid structure and a tab provided on the second locking member.

19. The assembly of claim 17, wherein the storage receptacle lid includes a first arm structure and a second arm structure that is spaced from the first arm structure, each arm structure including an opening for slidingly receiving the second locking member.

20. A vehicle assembly comprising:

a dashboard;

a glovebox mounted to the dashboard, the glovebox including:

a first wall and a second wall spaced from the first wall, the first and second walls at least partially defining a storage compartment, each of the first wall and the second wall including an opening; and a lid movably mounted to the glovebox for selectively providing access to the storage compartment, the lid including a first sidewall and a second sidewall spaced from the first sidewall, each of the first sidewall and the second sidewall having a lock opening, the lock opening being aligned with one of the openings provided in the first and second walls when the lid is in a closed state; and an opening and closing mechanism operably associated with the glovebox, the mechanism including:

a push button movably supported on the dashboard and having an inclined face at its rear end;

a spring-loaded button pin positioned on the dashboard and having a first inclined face corresponding in shape to the inclined face of the push button, wherein in the lid closed state, the button pin selectively engages the opening provided in the first wall and the lock opening provided in the first sidewall a lid linkage moveably supported on the lid, wherein in the lid closed state, the button pin displaces the lid linkage toward the second wall and the lid linkage selectively engages the lock opening provided in the second sidewall and the opening provided in the second wall;

a first spring for normally biasing the button pin toward the first wall; and a second spring for normally biasing the lid linkage away from the second wall, the second spring being intervened between a lid structure and a portion of the lid linkage;

wherein displacement of the push button engages the inclined face of the push button with the corresponding first inclined face of the button pin, the button pin being movable in a transverse direction relative to the movement of the push button away from the glovebox, movement of the button pin allowing the lid linkage to be biased in the same direction as the button pin away from the second wall.

* * * * *